United States Patent
Phule

(10) Patent No.: US 12,149,655 B1
(45) Date of Patent: Nov. 19, 2024

(54) SYSTEM AND METHOD FOR CONTACT CENTER TEST AUTOMATION

(71) Applicant: Morgan Stanley Services Group Inc., New York, NY (US)

(72) Inventor: Jayashree Phule, Pune (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/480,147

(22) Filed: Oct. 3, 2023

(51) Int. Cl.
| | |
|---|---|
| *H04M 3/00* | (2024.01) |
| *H04M 3/24* | (2006.01) |
| *H04M 3/51* | (2006.01) |
| *H04M 3/523* | (2006.01) |
| *G06Q 30/015* | (2023.01) |

(52) U.S. Cl.
CPC ........... *H04M 3/24* (2013.01); *H04M 3/5175* (2013.01); *H04M 3/5183* (2013.01); *H04M 3/5235* (2013.01); *G06Q 30/015* (2023.01)

(58) Field of Classification Search
CPC . H04M 3/5175; H04M 3/5183; H04M 3/5235
See application file for complete search history.

(56) References Cited

U.S. PATENT DOCUMENTS

| | | |
|---|---|---|
| 6,205,412 B1 | 3/2001 | Barskiy et al. |
| 11,095,774 B1 | 8/2021 | Willshire |
| 2002/0169963 A1* | 11/2002 | Seder ................ G06F 21/31 713/176 |
| 2004/0008825 A1 | 1/2004 | Seeley et al. |
| 2006/0167970 A1 | 7/2006 | Seeley et al. |
| 2011/0150189 A1 | 6/2011 | Kulkarni |
| 2016/0212073 A1 | 7/2016 | Kulkarni et al. |
| 2016/0219143 A1 | 7/2016 | Zilles et al. |
| 2017/0264575 A1 | 9/2017 | Willshire |
| 2019/0007550 A1 | 1/2019 | Kulkarni et al. |
| 2020/0228476 A1 | 7/2020 | Fejes et al. |
| 2021/0174288 A1* | 6/2021 | Gvildys ............... G10L 15/26 |
| 2022/0124057 A1 | 4/2022 | Kulkarni et al. |
| 2023/0186317 A1* | 6/2023 | Friio ............... G06Q 10/06313 705/304 |

OTHER PUBLICATIONS

Cyara's Rest API:_Limitless Integration & Extensibility, 2023 https://cyara.com/wp-content/uploads/2023/01/API-Datasheet-01062023.pdf, downloaded on Oct. 3, 2023.
Overview Developer Genesys, 2023, downloaded on Oct. 3, 2023, https://developer.genesys.cloud/routing/conversations/.

* cited by examiner

*Primary Examiner* — Rasha S Al Aubaidi
(74) *Attorney, Agent, or Firm* — PEARL COHEN ZEDEK LATZER BARATZ LLP

(57) ABSTRACT

A system and method may test a contact center or other entity by causing, by a computer processor, a number of computerized processes (e.g. a simulated caller or customer) to each initiate a telephone call to a contact center, each telephone call associated with a customer identification and intent and determine, for each telephone call if the contact center system data is correct. A number of computer processes (e.g. a simulated agent or other process) may each connect to a CRM system and connect to one of the telephone calls. A centralized process may organize and cause to be initiated a number of different such interactions, and afterwards check various components of the contact center to validate if the interaction data as known by the centralized process matches the data as recorded by the contact center.

20 Claims, 4 Drawing Sheets

FIG. 4

Cucumber Report

| Project | Date |
|---|---|
| cucumber-jvm | 24 Jul 2025, 16:19 |

Feature Report

| Feature | Steps | | | | | | Scenarios | | | Features | |
|---|---|---|---|---|---|---|---|---|---|---|---|
| | Passed | Failed | Skipped | Pending | Undefined | Total | Passed | Failed | Total | Duration | status |
| GSD Smoke End to End Test | 5 | 0 | 0 | 0 | 0 | 5 | 1 | 0 | 1 | 3:52.906 | Passed |

Feature GSD Smoke End to End Test
Tags: @Smoke Test @GenSupport
Scenario IVR - call transferred to cloud and connect with an agent - GenSupport ✱   3:52.906
Hooks ✱
  Before com.ms.wm.cyaraselenium.stepdefinition.common.Stepdefinition.beforeScenario(io.cucumber.java.scenario)   0.413
Steps ✱
  Given User executes cyara test case id "14276"   4.979
  And User answers the inbound call with a timeout of "400" seconds   2:46.155
  And User verifies salesforce ui kvp details   4.038

| KEY | VALUE |
|---|---|
| IVRCallTypes | TC_General_Support |
| IvrCallIntentLabel | TC_Default |
| skillLabel | TechConnect |

When User disconnect the call by selecting "Default Wrap-up Code" wrapup code   10.683
  Then validates KVP details   47.050

| KEY | VALUE |
|---|---|
| MS_DNIS | +15555555555 |
| MS_Callback_HoldingQueue | GSD_Callbacks |
| mssb_ivr_emp_id | 13RVM |
| MS_LOB | GSD |
| MS_Queue | GenSupport |
| MS_ActiveCallType | true |
| MS_DNISType | IVR |
| Call Type | TC_General_Support |
| mssb_ani_lookup_needed | false |

SYSTEM AND METHOD FOR CONTACT CENTER TEST AUTOMATION

FIELD OF THE INVENTION

The present invention relates generally to contact center test management; for example for automated testing of multiple-unit contact centers.

BACKGROUND OF THE INVENTION

A contact center or call center may include multiple components. For example, when customers call the contact center, customer routing systems, such as those provided by Genesys, may accept customer telephone calls or other contacts, and based on customer input (e.g. via interactive voice response (IVR) input), route the calls or contacts to a certain agent to interact with the customer. An agent may use telecommunications (e.g. softphone) and customer relationship management (CRM) software such as that provided by Salesforce, Inc. to interact with a customer and to manage the interaction, e.g., accessing customer records.

These various components may be tested or validated. For example, after a test call, data created or populated into the various systems may be checked to ensure it is the data expected based on the text call. Using prior art testing methods, it may be difficult to validate these different components. Testing may use manual processes to set up multiple fake automated agents which receive calls. In prior art manual testing, a system may initiate testing and a human may validate data at each state.

SUMMARY

A system and method may test a contact center or other entity by causing, by a computer processor, a number of computerized processes (e.g. a simulated caller or customer) to each initiate a telephone call to a contact center, each telephone call associated with a customer identification and intent and determine for each telephone if the contact center system data is correct. A number of computer processes (e.g. a simulated agent or other process) may each connect to a CRM system and connect to one of the telephone calls. A centralized process may organize and cause to be initiated a number of different such interactions, and afterwards check various components of the contact center to validate if the interaction data as known by the centralized process matches the data as recorded by the contact center.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings.

FIG. 4 shows an example report, according to some embodiments of the present invention.

Figure 1:
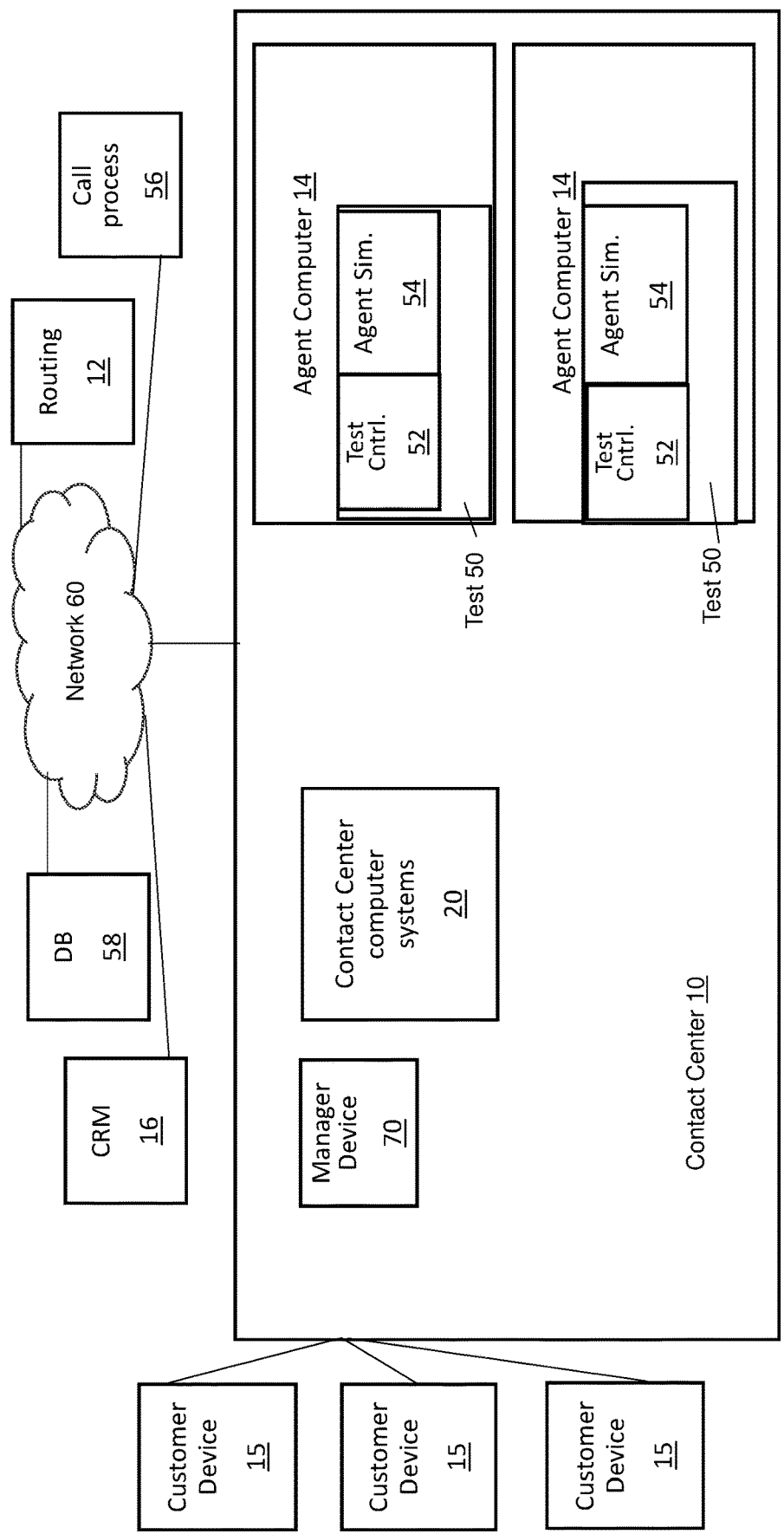
FIG. 1 depicts a contact center test system according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments may test a contact center or other computer system or entity by causing a number of computerized processes (e.g. a simulated caller or customer) to each initiate a telephone call or interaction (e.g. via a text or other information channel) to a contact center. A number of computer processes (e.g. a simulated agent or other process) may receive the incoming calls or interactions. A centralized process may organize these interactions, and afterwards check various components of the contact center to validate if the interaction data as known by the centralized process matches the data as recorded by the contact center. Embodiments may improve contact center test technology, and thus contact center technology. Prior approaches to contact center testing lack end-to-end automation as provided by embodiments of the present invention. Embodiments may validate multiple aspects of calls using the same overall process, applied iteratively or repeatedly with different data. Key-value pair (KVP) or other details may be validated from a user interface (UI, e.g. the fake agent populating data into a CRM system) perspective and for other contact center components such as the call routing (e.g. cloud) side. The same process may call routing services, possibly using their SDK (software development kit) for faster processing, to validate data such as KVPs stored in a call routing service. While prior technology such as Cyara tools may provide facilities to make a call, these technologies are limited and cannot provide end-to-end and hybrid automation as with embodiments of the present invention. Prior approaches may require a person to manually operate each testing component. Embodiments may provide a hybrid framework (e.g. testing various components of the call handling process, such as a web component, an API component, and a database component) which ties every point into one thread, so that test developers do not have to manually execute or monitor the process at the level of each step. Rather, a tester can trigger a test process one time and it will mimic all points of the call handling process. The systems to be tested may route incoming calls to a fake agent desktop, e.g. a Salesforce application, and the fake agent may pick up the call. A test system may validate that data the system generates based on the call is correct, such as KVPs, customer name, social security number (SSN), etc.

A contact center may be a centralized technology system, possibly associated with an office or entity, used for receiving or transmitting a large volume of enquiries, communications, or interactions. The enquiries, communications, or interactions may be telephone calls, emails, message chats, SMS (short message service) messages, etc. A contact center may, for example, be operated by a company to administer incoming product or service support or information enquiries from customers/consumers. A call center may refer to a contact center that primarily handles telephone calls rather than other types of enquiries, communications, or interactions.

FIG. 1 depicts a contact center test system, according to embodiments of the present invention. Referring to FIG. 1, a contact center 10 may include or access a call routing system 12, such as provided by Genesys, which may accept incoming telephone calls or other contacts from customer communications devices 15 (e.g. computers communicating via VOIP methods, telephones, smartphones, etc.), route the contacts to a certain agent terminal or computer 14 among agent terminals 14, so agents operating terminals 14 may interact with the customer. An agent, via a terminal 14, may use telecommunications (e.g. softphone) and CRM systems or software 16 such as that provided by Salesforce, Inc. to interact with a customer (e.g. via a voice over IP (VOIP) call using a softphone) and to manage the interaction. One or more contact center computer systems 20 may operate IVR systems, database systems for contact center operation, or other functions. Network 60 such as the internet may connect contact center 10 and other components described. A manager device 70 may be a computer system or terminal allowing a user to manage a test process, view reports, etc.

Testing systems 50 may include test management processes that may engage with contact center 10 elements to test elements of contact center 10. In one embodiment a separate instantiation of a testing system 50 may be executed by each agent computer 14, and may include, for example control processes 52 such as a Gradle process and Cucumber test processes for controlling the overall process; and an agent simulation process 54 for simulating "fake" computerized agents (e.g., a Selenium web-based processes; other processes such as the Cypress system, may be used to simulate agents), which may execute on agent computer 14 or elsewhere. A control process 52 executing on a first agent computer may in some embodiments cause a call to be made to a different agent computer. In other embodiments testing systems 50 may be executed by different computers. A call process 56 for simulating incoming calls, such as a Cyara process may be executed by a remote cloud computing device or server, or alternatively contact center 10. A database 58 for collecting test data such as interaction details, e.g. from interaction logs, KVP validations, and generated reports may be executed by a cloud computing system, a contact center computing system 20, or another computer. Certain data to be validated may be stored in specific systems, e.g. a CRM system 16 or another system, while other data to be validated may be stored in database 58. For example, after a call ends, resulting data such as call interaction reports may be stored, e.g. by a routing system or other systems, in database 58, and some of the database 58 data may be duplicative to that in other systems. While specific tools, processes and providers (e.g., Gradle processes, Cucumber processes, Salesforce processes, Cyara processes, etc.) are discussed as examples, other embodiments may use other specific processes. While specific modules and servers are described herein as executing specific functions, in other embodiments, the functions described herein may be performed by different modules or hardware.

In FIG. 1 call or customer routing system 12, CRM systems or software 16, call process 56 and database 58 are shown physically separate from contact center 10, e.g. operating in the cloud, although in other embodiments such systems may be physically part of contact center 10. In FIG. 1 systems such as testing systems and agent simulation process 54 are shown physically executed by agent computer, within contact center 10, in other embodiments such systems may executed in other systems, e.g., by cloud computing systems.

During non-test operation, a real human customer may call a contact center, and using IVR may choose a subject, e.g., debit/credit card, etc. which causes the system to navigate or route the call (e.g. using the Genysis system) to a specific agent. Agents may log in to a customer relationship management system (e.g. the Salesforce system). Such a CRM system (e.g. the Salesforce system) may provide a Softphone system to an agent, including a display or screen by which an agent may disconnect, mute, etc. A Genysis system (e.g. a cloud-based system) may route calls. Referring to FIG. 1, during non-test operation, a customer communications device 15 may initiate a call or interaction to contact center 10. This call may be routed by routing system 12 to an appropriate agent terminal 14 so that the customer and agent can communicate, and the appropriate data regarding the call and customer may be available to the agent via CRM software 16. During test operation, a testing system 50 may operate a control process 52 to cause a call process 56 to simulate an incoming call to routing system 12, which may route the simulated call to agent simulation process 54. Call process 56 may interact with routing system 12 via dual-tone multi-frequency signaling (DTMF), IVR, or other technologies. Testing system 50 may analyze data populated at CRM software 16 or database 58, to determine if the proper data (e.g. KVP data) was populated, and may produce a report, e.g. saved in database 58. Testing system 50 may include fake data defining calls, and may initiate calls from fake or test telephone numbers.

A call process 56 may initiate or generate a contact or interaction (e.g. a fake or test telephone call or other contact) incoming to contact center 10. Such a telephone call may use a traditional telephone line, e.g. with a telephone number dedicated to a test process, and may be associated with, e.g., a telephone number, a customer identification and intent. For example, call process 56 may call from a certain telephone number (which is typically detected by contact center 10) and may provide input, such as DTMF responses or audio responses, indicating call intent or interaction category, such as billing, technical assistance, complaint, refund, benefits, etc. The telephone call may be received by the contact center 10. Routing system 12 may route the call to an agent desktop (e.g. the desktop of agent processes 54). Agent processes 54 may pick up, answer or receive the call. Call process 56 may provide to agent processes 54 fake or test information, such as customer identification, reason for calling, etc.

A call process 56 may have its function defined, e.g. by a Cyara test case including for example "expect to hear" (e.g. what a fake customer hears) and "reply with" (e.g. what a fake customer replies with) pairs and other data such as pause and wait times. This interaction may be with a routing system 12. For example "expect to hear" may be "Press 1 for billing; and press 2 for lost credit card" and "reply with" may be a specific response for a test case, e.g. "1". In one embodiment a call process 56 may dial a toll-free number to reach a fake agent. Once the call is connected dial DNIS (Dialed number Identification Service) information and other customer information may be generated.

A customer routing system 12, such as provided by Genesys may receive calls from call processes 56 and route them to agent processes 54, and may also provide services such as database services. Routing system 12 may interact with a call process 56, e.g. via IVR, DTMF, or other technology, and determine intent. Based on this intent, routing system may route the call to a particular type or category of agent, or fake agent in the case of a test system. Call routing system 12 may require, e.g. an Oauth authorization from a call process 56. Other routing systems such as Amazon Web Services (AWS) or Google system may be used. A call process 56 when calling contact center may first interact with IVR functionality (e.g. executed by contact center computer systems 20), using DTMF or natural language inputs, and appropriate instructions or inputs may then be sent to customer routing system 12 to route calls.

Multiple agent processes 54 (such as Selenium processes, or other processes) may simulate agents answering, handling or receiving calls, operating a telephone process such as a softphone, interacting with CRM software 16 or call routing system 12, and interacting with call processes 56. Typically, a particular agent process 54 is dedicated to a particular intent or subject, e.g. billing, and call routing system 12 routes calls with a specific category of intent to a particular type of agent process 54. For example, one or more agent processes 54 may have a calltype or intent of General Support; and another one or more agent processes 54 may have a calltype or intent of Tech Support. Such routing may be validated e.g. by KVP validation. In one embodiment agent processes 54 may be executed by and take control of an agent computer 14 (which during non-test periods, e.g. the daytime, may be used by a human agent). Agent processes 54 may (e.g. at the initiation of testing system 50) log in to CRM software 16, e.g. using an identification (ID) and password unique to that fake agent processes 54. Agent processes 54 which connect to or log in to a CRM system may be executed on agent computers 14 which during normal operation are operated by a human contact center agent. Agent processes 54 may for example control or simulate mouse and keyboard inputs to, and read output from (e.g. screen outputs), agent computer 14 to perform testing tasks, e.g. as clicking on button, reading text, inputting or setting text etc. Agent processes 54 may interact with other software such as CRM software 16 via WebRTC or other interface technology. Typically, call process 56 may interact with routing system 12 using, e.g. IVR and other techniques. Agent processes 54 in one embodiment does not engage in a verbal or other conversation with a process calling that agent, but other embodiments may engage in a conversation. Agent processes 54 may for example, receive a call e.g. via routing process 12, mute the call for a period (e.g. a minimum of 5 seconds), hold for a period of time, e.g. one second, or another length of time, then disconnect the call. Such mute, hold, and disconnect functionality, e.g. via call buttons, may be validated. This may result, for example, in the other party on the call (e.g. call process 56), receiving hold music. The other party on the call (e.g. call process 56) may provide input to agent process 54, e.g. verbally (e.g. artificial or recorded speech) or using DTMF input. The input may for example, request a certain type of service (e.g., "billing", "I lost my credit card" etc.) or be other input. The input may be for example, a customer identification (e.g., name, social security number, account number, etc.) provided, e.g. audibly, via DTMF, or in another manner. Agent process 54 may populate a database such as a CRM systems or software 16 database with received data such as customer identification, intent or reason for calling, etc. Agent processes 54 may be initiated by or controlled by control processes 52. Different instantiations of agent processes 54 may include different skills or tasks (e.g. billing inquiries; technical support questions; etc.). Testing or validation may check whether the proper type of fake agent has routed to it calls with the proper intent.

CRM software 16 may be provided by, for example, Salesforce, Inc. Fake or artificial test data may be seeded into CRM software 16, and this data may correspond to other data seeded into other components, such as call processes 56, so that when a call processes 56 calls contact center 10, it is recognized as a (e.g., artificial or fake) known customer by CRM software 16. CRM software 16 may provide a VoIP, chat, or other connection (e.g. a Softphone system) to agent processes 54, for example including a display or screen with which an agent process 54 may interact, mute, etc.

Testing system 50 may be executed by, e.g. agent computers 14, contact center computers 20, or another processor, and may cause contact center 10 elements to operate, to test the elements of contact center 10. For example, testing system 50 may cause multiple computerized processes such as call processes 56 to each initiate an interaction, contact, or telephone call to contact center 10, where each telephone call is associated with, e.g., a telephone number, a customer identification, intent, etc. As a result of testing system 50 initiating calls, contact center 10 may cause to operate, or initiate, a number of computer processes such as agent processes 54 to each connect to CRM systems or software 16 and/or customer routing system 12 and to connect to one of the incoming telephone calls. Each call generated by testing system 50 may be assigned an identifier (e.g. uniqueID) which may be an interaction or conversation identification. This identifier may be propagated through the test process, and when validating or checking data, testing system 50 may access this identifier from the validated systems, to correlate data associated with a certain call as stored in validated systems with the data of that call known by the testing system as the true data.

Testing system 50 may include, for example control processes 52 such as a Gradle process and Cucumber test processes. An instantiation of control processes 52 may, e.g. executed by agent computer 14, connect to cloud-based or remote systems such as an instantiation of call process 56 to cause, e.g. using a REST assured tool or REST API process, such systems to generate a call which is routed back to the same local agent computer executing control processes 52, where the call is answered by an agent simulation process 54. Control processes 52 may execute Gradle code to cause an agent simulation process 54 (e.g. a Selenium process) to execute in a particular manner, to mimic actions of agents.

Testing system 50 may operate a campaign to send multiple telephone calls or interactions to the same contact center at the same time, or over the same time period. Testing system 50 may determine, for each telephone call made by a call processes 56, if the contact center system data populated as a result of the call is correct. Testing system 50 may receive, access or input information from contact center systems describing each of the telephone calls, in order to validate the information, determine whether or not the information populated in systems such as routing or CRM systems is as expected or correct, or provide a report on the information. Validated information may include for example, (fake) customer identification, intent, or other data. For example, testing system 50 may compare KVPs, e.g. stored in a Gradle or Cucumber process that initiates a certain call to data stored in call center 10 computer systems 20, database 58, CRM systems 16, routing systems 12, or other systems, and generate or display (e.g. on manager device 70) a report detailing the fake calls and which data items or KVPs stored in call center 10 matches or is equal to its corresponding item in the original call made (whose validation was correct), and which does not (whose validation was not correct), and in which systems (e.g. CRM, call routing system, etc.) these data items are found. Testing routing (e.g. a Genysis system), database, or other systems are working and generating the correct data. A second test may be triggered after call completion to test post-call data, and to generate a report. In some cases only a portion—e.g. a call routing system of a database system—is tested or validated.

Table 1 below depicts an example Cucumber feature file which is an actual test case. In one embodiment iteration or repetition may be achieved by having multiple blocks in a Cucumber file, each block initiating a separate call, where each separate call may include the same or different call details from other calls. In some embodiments, a master script as in Table 1 may call the same block of code multiple times, in order to execute multiple test calls. While Cucumber, Gradle, Salesforce, Cyara and other specific systems are used as an example, other systems may be used.

@DemoTest1 @E2E

Scenario Outline: MSVA Test case

Given User executes cyara test case id "13499"//Triggers incoming call using Cyara test And User switches to frames in order "sfdcSoftphoneIframe,sfPhoneIframe,showCcaasFrame"

And User answers the inbound call with a timeout of "250" seconds

And User mutes the softphone

And User switches to frames in order "sfdcSoftphoneIframe,sfPhoneIframe"

And User waits for "1" seconds

---

Then User verifies salesforce ui kvp details // Compare and verify data populated to CRM (e.g. Salesforce) is correct
```
| KEY              | VALUE           |
| nameLabel        | <Name>          |
| accountNoLabel   | <AccountNumber> |
| accountStatusLabel | <Status>      |
| accountTypeLabel | <Type>          |
| accountTierLabel | <Tier>          |
| tfnDialedTypeLabel | <TFNDialed>   | // Toll free number
| IVRCallTypes     | <IVRCallType>   | // Call type set and routed to from IVR
| ivrCallIntentLabel | <IVRCallIntent> |
| skillLabel       | <Skill>         |
```
--- system 50 may access data in customer routing system 12, CRM systems or software 16, and/or other systems, using, e.g. graphical user interfaces (GUIs), application programming interfaces (APIs), database requests, or other methods. Test processes may be executed when the contact center is not operational, such as overnight, when there is less or no usage by real customers and real agents.

A Gradle thread may be a build automation and execution tool which may invoke the various sub-items or sub-processes, to control the overall process. A Gradle process may trigger a test process such as a Cucumber test process, which may be used to test software, and which may execute automated acceptance tests written in a behavior-driven development (BDD) style. A test suite may be executed, such as a Gradle execution using Cucumber test cases, using multiple cases (e.g., a suite) which includes multiple different test scenarios. Test scenarios may analyze data in parallel with the actual test call being connected, e.g. to check if call And User clicks on "callEndBtn"

And User switches to frames in order "sfdcSoftphoneIframe,sfPhoneIframe,showCcaasFrame"

And User verifies element "WrapUpCode" displayed on screen

And User clicks on "SelectWrapUpCode"

And User clicks on "WrapupCode Value"

And User clicks on "WrapUpSubmitBtn"

And User waits for "5" seconds

Then User verifies element "StatusListArrowButton" displayed on screen

And User clicks on "StatusListArrowButton"

And User clicks on "AvailableButton"

Then User verifies element "Available" displayed on screen

And User retrieves interaction id

And User retrieves participant details//Participants include fake agent & fake customer

---

And validates KVP details // Compare and verify data populated from routing system is correct
```
| KEY    | VALUE  |
```

-continued

```
        | MS_LOB          | <MS_LOB>         | // Line of business
        | MS_Queue        | <MS_Queue>       |
        | mssb_call_type  | <mssb_call_type> |
        | MS_Skill        | <MS_Skill>       |
        |MS_FASegmentFlag | <MS_FASegmentFlag> | // Financial advisor
    Examples:
        | Name         | AccountNumber | Status | Type | Tier        | TFNDialed   |
IVRCallType | IVRCallIntent   | Skill       | MS_LOB | MS_Queue | mssb_call_type |
MS_Skill | MS_FASegmentFlag |
    | Abcdefgh ijklmno | 123          | Open | REG | Tier 10 < $250k | 123456789012 | Inbound
| FinancialAdvisor | CAC Tier 2 Menu | XYZA    | XYZA_FA | cf        | XYZA_FA | true
|
```

TABLE 1

Table 2 below depicts an example Gradle feature file which is an example Gradle execution to trigger a test case.

```
task cucumberExecutionAPI( ) {
    dependsOn assemble, compileTestJava
    String folder = 'src/test/resources/features/'
    String tags = "@DemoTest1"
    println('tags = ' + tags)
    doLast {
        javaexec {
            mainClass = "io.cucumber.core.cli.Main'
            classpath = configurations.cucumberRuntime + sourceSets.main.output + sourceSets.test.output
            println('tags are not null = ' + tags)
            args = ['-- tags', tags,
                '--plugin', 'html:target/cucumber-reports/report.html',
                '--plugin', 'html:target/cucumber-reports/cucumber-pretty.html',
                '--plugin', 'json:target/cucumber-reports/CucumberTestReport.json',
                '--plugin', 'rerun:target/cucumber-reports/rerun.txt',
                '--glue', 'com.ms.wm.cyaraselenium.stepdefinition.common', folder]
        }
    }
}
```

Table 2

Database 58 may have test results and generated reports saved or stored in it, and may store other information, such as data used to validate or compare to test results, e.g. interaction or customer details used as inputs to a test process, and data (e.g. KVP data) which are gathered as a result of a test process, and validations (e.g. whether or not these data match). Database 58 may be, for example, an SQL server, but may be another database or combination of databases.

Embodiments of the invention provide contact center end to end hybrid test automation. An embodiment of the present invention may improve testing and contact center technology to provide a consolidated approach to testing which ties different checks together. Embodiments may test a contact center system by initiating fake incoming calls which mimic normal customer flow (e.g. which go through a call routing system and landing at agents). Such testing may validate KVPs, for example where call intent is one key and the value is the actual intent or subject matter. A testing system may initiate a test, where the incoming call testing system provides information (e.g. voices using a fake voice, or uses telephone keypresses) to indicate "credit" and the testing system determines if a KVP populates in the contact center data system with the credit value and routes properly to an agent appropriate for the credit subject matter. Such a testing system may check if the KVPs are correctly mapped to the call, if a call routing system (e.g. the Genysis system) populates information properly (e.g., as checked in "Compare and verify data populated from routing system is correct" in Table 1), if routing works, if the agent actually gets to speak to the fake testing customer, and, after the call ends, if data resulting from the call is properly entered. For example, a system may use a Cyara API to generate a call and wait for the call to connect, e.g. for a minute (one example quality metric may be that 80% of calls should be received in 60 seconds). Such a test system may trigger a Cyara system for one minute and then check if the call is received or not periodically, e.g., every 10 seconds in a loop, then the fake agent may pick up call, then receive an interaction number from a Softphone user interface (e.g. via the Salesforce system). A testing system may then check that the data (e.g. KVPs) is correct.

Figure 2:
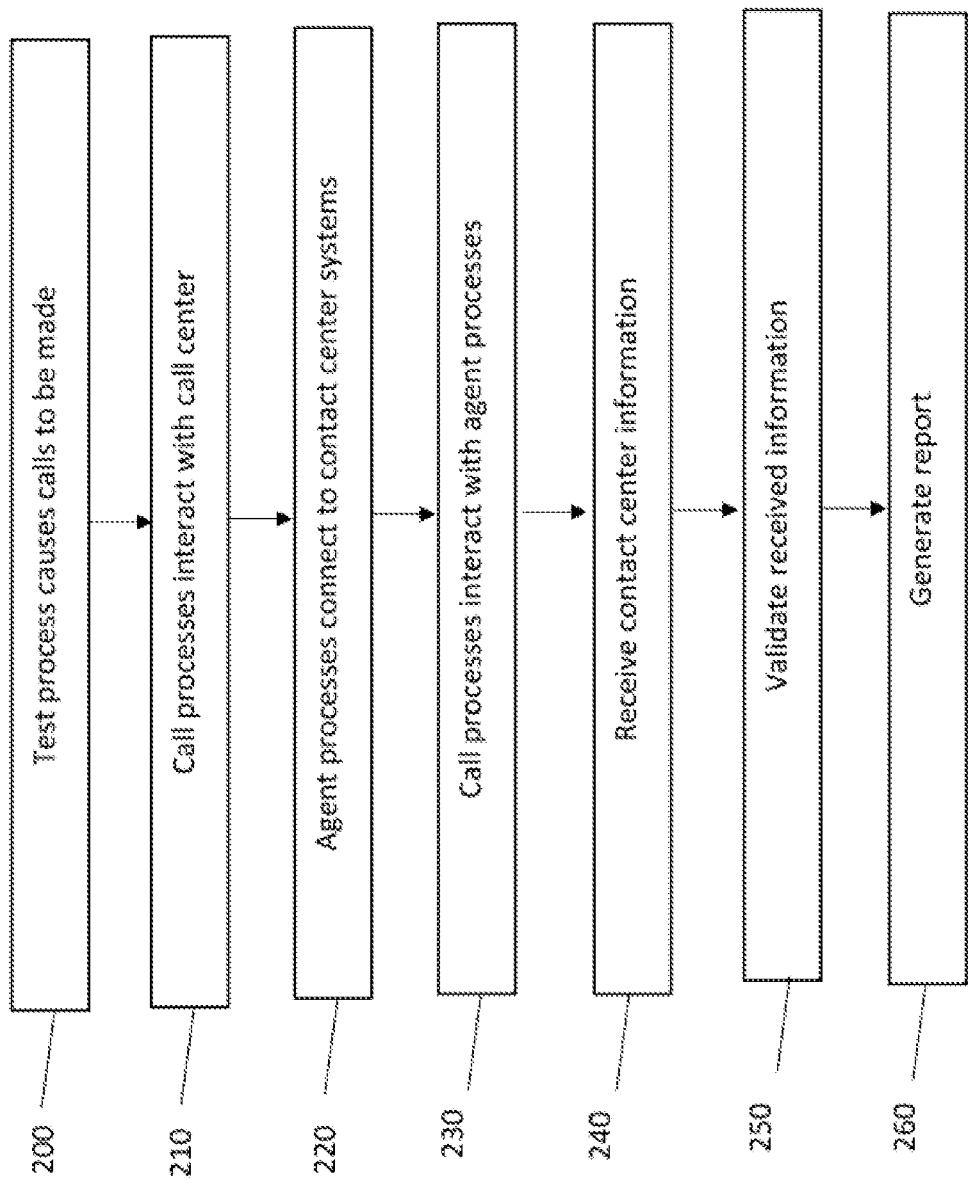
FIG. 2 is a flowchart of a method according to embodiments of the present invention.

FIG. 2 shows a flowchart of a method for testing a contact center according to embodiments of the present invention. The operations of FIG. 2 may be performed by computer systems shown in FIG. 1 and FIG. 3, but other computer systems may be used. While an exemplary method is depicted for illustrative purposes in the flowchart of FIG. 2, it will be appreciated by those skilled in the art that features and operations from this procedure may be selectively combined with features and operations from alternative embodiments of the invention without departing from the remit of the disclosure. Further, while certain features and operations are expressly included in the flowchart of FIG. 2, it will be appreciated by those skilled in the art that not all depicted features and operations are mandatory elements, and that different embodiments may omit certain features or operations without departing from the remit of the disclosure. Accordingly, embodiments including combinations of the features and operations recited in FIG. 2 are expressly within the remit of the disclosure and do not constitute an intermediate generalization of the same.

In operation 200 a computer processor executing a process such as a test management process (e.g., testing system 50) may cause one or more computerized processes acting as fake computerized callers such as call processes 56, to each initiate a contact or interaction such as a telephone call to a contact center. Each interaction or telephone call may be associated with a customer identification (e.g., name, telephone number, etc. and intent (e.g., purpose for call such as billing, complaint, lost credit card, etc.). Such associated information may be fake, input to and used by call process 56.

In operation 210 computerized processes acting as fake computerized customers or other types of humans may interact with a call routing system at the contact center, and the call routing system may route the calla to appropriate computer processes which may act as fake agents, such as agent processes 54. As a result of these interactions, data such as customer routing system data may be generated and stored, e.g. in interaction logs. A specific call may be identified by a unique interaction ID (e.g. uniqueID) or other ID, and associated with this ID in contact center data, and may be the same identifier used in initiating the call (e.g. Gradle and Cucumber data), so that the two may be correlated or matched. Thus, for each fake telephone call, the set of data used to cause a caller process to initiate the call may be associated with a unique identifier, and that same unique identifier may be used to correlate the contact center system data with that set of data.

In operation 220 the computer processor executing a process may cause one or more computer processes which act as fake agents, such as agent processes 54, to each connect to a CRM system. Such fake agents may connect to, receive or pick up one of the incoming interactions or telephone calls. A KVP such as agent status may be checked: for example if an agent has properly logged in its status KVP may be "available"; other agent statuses may be on-queue, Aqay, busy, offline, etc.

In operation 230 the computer processes acting as fake computerized callers may interact, e.g. via telephone or other communications connections, with agent simulation processes. As a result of these interactions, data may be generated and stored, e.g. as KVPs. Each of the fake customer and agent may branch its functionality and output based on a set of rules defining its behavior, and what it hears or has input to it via the telephone call or interaction.

In operation 240 information from the contact center system describing each of the interactions or telephone calls may be received. For example, the test management computer process (e.g. testing system 50) may access or input data resulting from operations 200-230, or other data, for example using GUIs. APIs, database requests, or other methods.

In operation 250 the results of the test calls may be validated, e.g., for each incoming interaction, contact or telephone call it may be determined if the computer system or contact center system data, e.g. stored in various systems, resulting from the incoming contact is correct. Actual information from the contact center system describing each of the interactions or telephone calls may be compared to the expected information for those calls. A process may compare the data stored by the contact center computer systems which resulted from the call or interaction, to the data used to initiate the call or interaction, to determine if the contact center systems correctly handled the call or interaction. For example, data stored during testing in operations 200-230 may include, for a specific call (e.g. identified by a interaction ID), the name of the fake caller or customer, e.g. "nameLabel", and this name may be compared to the name for that specific call known to the test management process, if the names are the same or match, this data item for this call may be labelled correct, and if not (no match, or an incorrect entry in call center records), this data item may be labelled incorrect. Other data checked may be queue (e.g. when an agent logs in it may enter its skill, which may dictate which queue it takes calls from; a KVP validation may check if the agent is in the correct queue), calltype, account number, customer or account status, customer account type, customer tier, caller intent, customer routing system data or routing, etc. Validating or determining, for each call if the contact center system data is correct may include if customer routing system data is correct, if customer relationship management system data is correct, or if other data is correct. In some embodiments, only a portion of a contact center may be tested, e.g. CRM, and in other embodiments, end-to-end testing may be done, testing all or multiple parts or all components of a contact center. Whether or not the incoming call is connected to an agent process or a call routing process may be recorded as data, which may be checked; if the call is not connected, a failure or "incorrect" may be included in the report for this call.

In operation 260 the results, or a report, may be generated or created based on the validations or determinations in operation 250. Features provided by Cyara such as Cruncher (e.g. enabling load testing by allowing multiple tests at once) and Pulse (testing whether an environment is up and working or not) or other features may be used. Results from various systems may be consolidated into a report to ensure each component of a contact center executed correctly, e.g., showing results for each component individually. Such a report may be displayed, for example, manager device 70.

Other operations or series of operations may be used.

Figure 3:
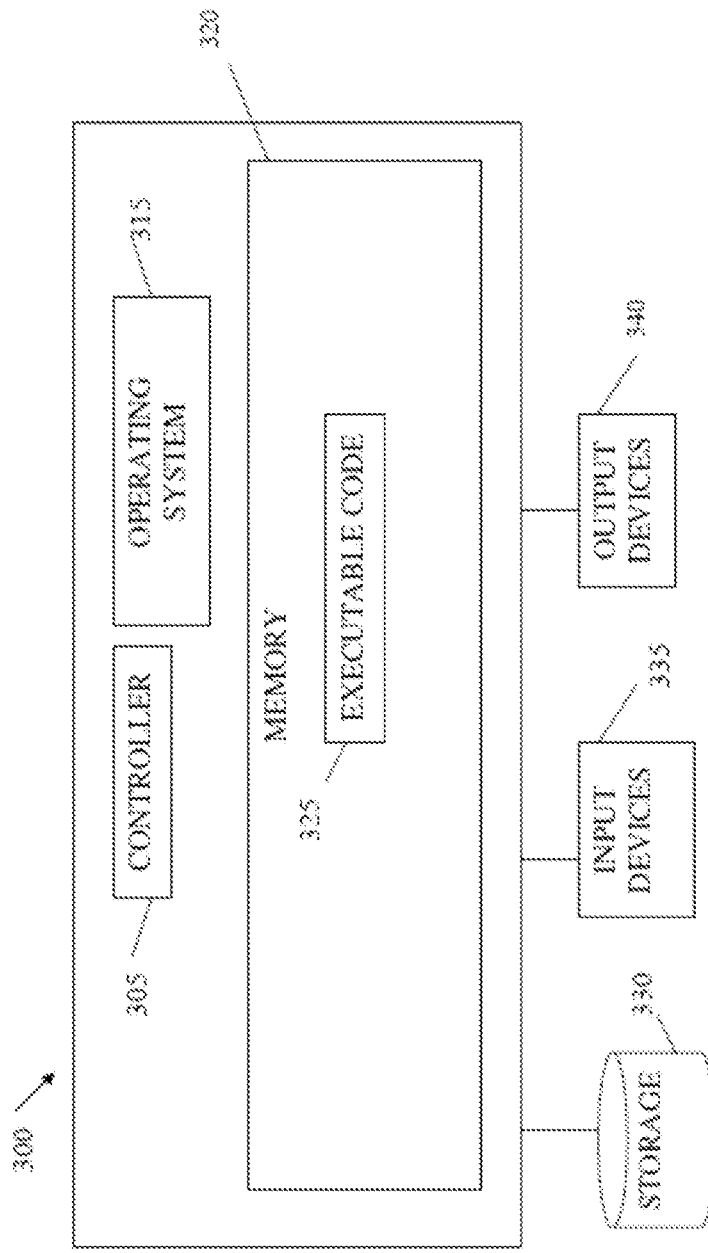
FIG. 3 shows a high-level block diagram of an exemplary computing device according to some embodiments of the present invention.

Reference is made to FIG. 3, showing a high-level block diagram of an exemplary computing device according to some embodiments of the present invention. Computing device 300 may include a controller 305 that may be, for example, a central processing unit (CPU) or any other suitable multi-purpose or specific processor(s) or controller(s), a chip or any suitable computing device, an operating system 315, a memory 320, executable code 325, a storage system 330, input devices 335 and output devices 340. Controller 305 (or one or more controllers or processors, possibly across multiple units or devices) may be configured to carry out methods described herein, and/or to execute or act as the various modules, units, etc., for example when executing code 325. More than one computing device 300 may be included in, and one or more computing devices 300 may be, or act as the components of, a system according to embodiments of the invention. Various components, computers, and modules of FIG. 1 may be or include devices such as computing device 300, and one or more devices such as computing device 300 may carry out functions such as those described in FIG. 2. Components in FIG. 1, such as contact center 10 computer systems, cloud systems, customer routing system 12, customer communications devices 15, agent terminals 14, CRM software 16, manager device 70, testing systems 50, and other modules and processes such as Gradle or Cucumber processes, may be or may be executed by a computer system such as in FIG. 3.

Operating system 315 may be or may include any code segment (e.g., one similar to executable code 325) designed and/or configured to perform tasks involving coordination, scheduling, arbitration, controlling or otherwise managing operation of computing device 300, for example, scheduling execution of software programs or enabling software programs or other modules or units to communicate.

Memory 320 may be or may include, for example, a Random Access Memory (RAM), a read only memory (ROM), a Dynamic RAM (DRAM), a volatile memory, a non-volatile memory, a cache memory, or other suitable memory or storage units. Memory 320 may be or may include a plurality of, possibly different memory units. Memory 320 may be a computer or processor non-transitory readable medium, or a computer non-transitory storage medium, e.g., a RAM.

Executable code 325 may be any executable code, e.g., an application, a program, a process, task or script. Executable code 325 may be executed by controller 305 possibly under control of operating system 315. For example, executable code 325 may configure controller 305 to perform methods or parts of methods as discussed herein. A system according to some embodiments of the invention may include multiple code segments 325 that may be loaded into memory 320 or another non-transitory storage medium and cause controller 305, when executing code 325, to carry out methods described herein.

Storage system 330 may be or may include, for example, a hard disk drive, a CD-Recordable (CD-R) drive, a universal serial bus (USB) device or other suitable removable and/or fixed storage unit. Data as discussed herein may be stored in storage system 330 and may be loaded from storage system 330 into memory 320.

One or more input device(s) 335 may be or may include a mouse, a keyboard, a microphone, a touch screen or pad or any suitable input device. One or more output device(s) 340 may include displays or monitors, speakers and/or any other suitable output devices. For example, a wired or wireless network interface card (NIC), a printer, a universal serial bus (USB) device or external hard drive may be included in input devices 335 and/or output devices 340.

In some embodiments, device 300 may include or may be, for example, a personal computer, a desktop computer, a laptop computer, a workstation, a server computer, a network device, or any other suitable computing device.

FIG. 4 shows an example report, according to some embodiments of the present invention.

Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for automated testing of a contact center comprising:
    causing, by a computer processor, a plurality of computerized processes to each initiate a telephone call to a contact center, each telephone call associated with a customer identification and intent;
    causing, by the computer processor, a plurality of agent simulation computer processes to each connect to a customer relationship management (CRM) system and to connect to one of the telephone calls;
    determining, for each telephone call if the contact center system data is correct by comparing one or more of actual customer routing system data and actual CRM system data to expected information; and
    generating a report based on the determination.

2. The method of claim 1, wherein the agent simulation computer processes which connect to a CRM system are executed on an agent computer which during normal operation is operated by a contact center agent.

3. The method of claim 1, wherein determining if the contact center system data is correct comprises receiving information from the contact center system describing each of the telephone calls.

4. The method of claim 1, wherein determining, for each telephone call if the contact center system data is correct comprises determining if customer routing system data is correct.

5. The method of claim 1, wherein determining, for each telephone call if the contact center system data is correct comprises determining if customer relationship management system data is correct.

6. The method of claim 1, wherein the report comprises validations of key value pairs (KVPs) of the CRM system and a call routing system.

7. The method of claim 1, wherein for each telephone call, the set of data used to cause a process to initiate the call is associated with a unique identifier, and the unique identifier is used to correlate the contact center system data with the set of data used to cause the process to initiate the call.

8. A system for automated testing of a contact center, the system comprising:
    a memory; and
    a processor to:
    cause a plurality of computerized processes to each initiate a telephone call to a contact center, each telephone call associated with a customer identification and intent;
    cause a plurality of agent simulation computer processes to each connect to a customer relationship management (CRM) system and to connect to one of the telephone calls;
    determine, for each telephone call if the contact center system data is correct by comparing one or more of actual customer routing system data and actual CRM system data to expected information; and
    generate a report based on the determination.

9. The system of claim 8, wherein the agent simulation computer processes which connect to a CRM system are executed on an agent computer which during normal operation is operated by a contact center agent.

10. The system of claim 8, wherein determining if the contact center system data is correct comprises receiving information from the contact center system describing each of the telephone calls.

11. The system of claim 8, wherein determining, for each telephone call if the contact center system data is correct comprises determining if customer routing system data is correct.

12. The system of claim 8, wherein determining, for each telephone call if the contact center system data is correct comprises determining if customer relationship management system data is correct.

13. The system of claim 8, wherein the report comprises validations of key value pairs (KVPs) of the CRM system and a call routing system.

14. The system of claim 8, wherein for each telephone call, the set of data used to cause a process to initiate the call is associated with a unique identifier, and the unique identifier is used to correlate the contact center system data with the set of data used to cause the process to initiate the call.

15. A method for automated testing of a computer system comprising:

causing, by a computer processor, a computerized process to initiate an interaction with a computer system, the interaction associated with an interaction category and identification;

the interaction received by an agent simulation computer process connecting to a customer relationship management (CRM) system;

comparing the data stored by the computer system resulting from the interaction, the data stored comprising actual customer routing system data and actual CRM system data, to the data used to initiate the interaction, to determine if the computer system correctly handled the interaction; and generate a report based on the determination.

16. The method of claim 15, wherein determining if the data is correct comprises receiving information from the computer system describing the interaction.

17. The method of claim 15, wherein determining if the data is correct comprises determining if customer routing system data is correct.

18. The method of claim 15, wherein determining if the data is correct comprises determining if CRM data is correct.

19. The method of claim 15, wherein the report comprises validations of key value pairs (KVPs) of the CRM system and a call routing.

20. The method of claim 15, wherein for each interaction, the set of data used to cause a process to initiate the interaction is associated with a unique identifier, and the unique identifier is used to correlate the computer system data with the set of data used to cause the process to initiate the interaction.

* * * * *